US008556337B1

(12) United States Patent
Cornitius-Cary

(10) Patent No.: US 8,556,337 B1
(45) Date of Patent: Oct. 15, 2013

(54) THERMAL COOLING/HEATING SEAT/BACKREST COVER

(76) Inventor: Tammy L. Cornitius-Cary, LaMarque, TX (US)

( * ) Notice: Subject to any disclaimer, the term of this patent is extended or adjusted under 35 U.S.C. 154(b) by 360 days.

(21) Appl. No.: 12/829,368

(22) Filed: Jul. 1, 2010

Related U.S. Application Data

(60) Provisional application No. 61/222,933, filed on Jul. 2, 2009.

(51) Int. Cl.
*A47C 31/11* (2006.01)
*A47C 7/62* (2006.01)

(52) U.S. Cl.
USPC .................. 297/180.11; 297/188.2; 224/275

(58) Field of Classification Search
USPC ............... 297/180.1, 180.11, 188.2, 188.06, 297/188.07; 244/275, 572
See application file for complete search history.

(56) References Cited

U.S. PATENT DOCUMENTS

| 4,868,898 | A | * | 9/1989 | Seto .............................. 219/528 |
| 5,545,198 | A | * | 8/1996 | Owens ......................... 607/108 |
| 5,613,730 | A | | 3/1997 | Buie et al. |
| 5,617,811 | A | | 4/1997 | Johnson |
| 5,639,145 | A | * | 6/1997 | Alderman ................ 297/452.45 |
| 5,700,284 | A | | 12/1997 | Owens |
| 5,806,925 | A | | 9/1998 | Hanley |
| 5,921,858 | A | | 7/1999 | Kawai et al. |
| 5,924,766 | A | | 7/1999 | Esaki et al. |
| 6,007,572 | A | * | 12/1999 | Baldwin ....................... 607/114 |
| 6,132,455 | A | | 10/2000 | Shang |
| 6,578,910 | B2 | | 6/2003 | Andersson et al. |
| 6,848,746 | B2 | * | 2/2005 | Gentry ........................ 297/380 |
| 6,857,954 | B2 | | 2/2005 | Luedtke |
| 7,070,231 | B1 | | 7/2006 | Wong |
| 7,134,715 | B1 | | 11/2006 | Fristedt et al. |
| 7,152,412 | B2 | | 12/2006 | Harvie |
| 7,238,101 | B2 | | 7/2007 | Kadle et al. |
| 7,517,013 | B1 | * | 4/2009 | Lowe ....................... 297/180.11 |
| 2003/0000983 | A1 | * | 1/2003 | Tyrer ............................ 224/572 |

OTHER PUBLICATIONS

"Seat Chiller", Mfg by Baby Dagny LLC, Palm Desert, CA (www.babydagny.com).
"Cold Seat", Mfg by Chaden Company LLC, Phoenix, AZ, (www.coldseat.com).
"Babybeecool" Mfg by D D & G Holdings, Phoenix, AZ, (www.babybeecool.com).

* cited by examiner

*Primary Examiner* — David Dunn
*Assistant Examiner* — Timothy J Brindley
(74) *Attorney, Agent, or Firm* — Kenneth A. Roddy

(57) ABSTRACT

A removable thermal cooling/heating seat/backrest cover has a generally rectangular rear panel formed of flexible water-resistant material, and a front panel including at least one large generally rectangular thermally insulated pocket having an outer side wall formed of a flexible sheet of water and mildew resistant material with an inner side wall formed of shiny reflective metalized foil laminated to closed cell polyethylene foam, the foil facing the interior of the pocket, and the foam facing the rear panel. The cover is removably mounted on the backrest and/or seat of a seating structure by mounting straps. The thermally insulated pocket holds a freezable or microwaveable gel pack for providing cooling or heating comfort to a user. The foil forms a reflective thermal barrier that radiates cold or hot temperatures toward the outer side wall and the foam facilitates maintaining the gel pack at a constant temperature.

5 Claims, 5 Drawing Sheets

THERMAL COOLING/HEATING SEAT/BACKREST COVER

CROSS REFERENCE TO RELATED APPLICATION

This application claims priority of U.S. Provisional Application Ser. No. 61/222,933 filed Jul. 2, 2009.

BACKGROUND OF THE INVENTION

1. Field of the Invention

This invention relates generally to seat covers, and more particularly to a removable seat/backrest cover for covering the seat and/or backrest of a seating structure and having one or more pockets that receive freezable or microwaveable gel packs for providing cooling and heating comfort to a person occupying the covered portion of the seating structure.

2. Background Art

Keeping cool in the summer and warm in the winter is a common problem for people who work outdoors and operate vehicles, for example mail carriers, construction workers, tractor drivers, bus drivers, crane operators, forklift operators, etc., because many of the of the vehicles and construction equipment are not equipped with an air conditioner or heater, nor equipped with electrical accessory receptacles or cigarette lighter receptacles. It is also often desirable for a person when sitting outdoors or enjoying recreational activities to obtain supplemental cooling or warming comfort, for example, when sitting on a lawn chair, beach chair, or other type of seating structure having a seat and backrest, or having no back rest, such as stadium seats and bleachers.

There are several patents directed toward vehicle seat covers that avoid direct contact between the user's skin or clothing and the sitting surfaces.

Hanley, U.S. Pat. No. 5,806,925, discloses a breathable and washable protective seat cover for automobile seats or the like which comprises a multi-layer construction configured to form a pocket at one end that fits over the upper end of the seat and an elongated section that loosely covers the front surfaces of the seat. Layers comprise an absorbent upper layer and a vapor permeable liquid-blocking polymeric membrane lower layer. The upper layer wicks moisture away from the occupant and readily releases it through evaporation, the lower layer provides a breathable property while blocking liquid water, sweat, mud, and the like, and provides a rubbery texture that grips the car seat upholstery to prevent movement or bunching of the seat cover when an individual enters the seat.

There are also several patents directed toward vehicle seat heating and/or cooling apparatus which draw electricity from existing power sources. The patents issued to Fristedt, Shang, Buie, Kadle, Harvie, Esaki, Kawai, Andersson, and Johnson patents are examples of these types of apparatus.

Fristedt et al, U.S. Pat. No. 7,134,715, disclose a heating apparatus for a vehicle seat comprising a temperature sensor that triggers electrical current for preventing seat temperature from falling below a predetermined minimum. It is intended to be used in connection with an electrically heatable seat.

Buie et al, U.S. Pat. No. 5,613,730, teach a portable temperature-controlled seat cover assembly configured to be releasably fitted over both a seat and seat-back. A fluid conduit within a fabric liner is electric-powered via a cigarette lighter adapter. A pump circulates the heated or cooled fluid through the fluid conduit.

Kadle et al, U.S. Pat. No. 7,238,101, disclose a thermoelectric thermally conditioned vehicle seat which augments the conditioned air provided by a conventional HVAC apparatus for cooling or heating the vehicle seat. Pre-conditioned air emanating from the HVAC is used to efficiently cool or heat the seat.

Harvie, U.S. Pat. No. 7,152,412, discloses a portable, battery-operated personal back rest and seat cooling and heating system for providing several hours of high efficiency cooling or heating of a seat cushion and seat-back, a mattress, or the like. The cooling aspect consists of a plurality of reversible thermoelectric cooler modules which are attached to a liquid heat exchanger frame.

Esaki et al, U.S. Pat. No. 5,924,766, disclose a temperature conditioner for a vehicle seat that cools or warms air inside a vehicle while transferring the air from a blower to a plurality of vehicle seat holes based upon the "Peltier effect" which occurs when current passes through two interconnected dissimilar metals or semiconductors. The current drives a transfer of heat from one junction to the other, wherein one junction cools off while the other heats up.

Kawai et al., in U.S. Pat. No. 5,921,858, issued Jul. 13, 1999, teach a ventilator for use with a vehicle seat comprising a cushioned air sheet configured with a plurality of passages through which air may be encouraged to flow. Preconditioned air may be caused to enter an air channel contained within the air sheet and cools or warms the user via a contact surface of the air sheet.

Andersson et al., U.S. Pat. No. 6,578,910, disclose a ventilation seat configured with a network of ducts located beneath the seat and having a fan for displacing air through a plurality of centrally-located ducts away from the seat's surface. Once the seat surface conditions have been attained as contemplated, the fan speed is reduced to sustain the occupant's comfort. The fan is arranged to be in fluid contact with the plurality of ducts to assure an efficient air flow from the seat surface through the duct network to the opposite side of the seat.

Johnson, U.S. Pat. No. 5,617,811, discloses a temperature regulated seat pad for a motor boat that taps into the power and heat of the engine used on in-board and out board motor boats to warm or to cool the rider. Hot water that has reached the operating temperature of the motor boat engine is extracted from the circulating water pump, while cool (ambient) water is extracted from the high pressure side of the intake pump. The predetermined seat temperature is attained by appropriately mixing circulating (hot) water from the motor boat engine with ambient (cool) water from the intake pump.

Wong, U.S. Pat. No. 7,070,231 discloses a 12-volt thermoelectric microfiber and mesh self-cooling seat cushion which has a fan in the cushion that plugs into a vehicle's cigarette-lighter socket and circulates air through a plethora of ventilated spaces in the cushion and keeps the user's back cool with a breeze between the user's back and the vehicle seat.

As discussed above, many people work outdoors and operate vehicles and construction equipment such as, for example, mail carriers, construction workers, tractor drivers, bus drivers, crane operators, forklift operators, etc. However, these types of vehicles are typically not equipped with electrical accessory receptacles or cigarette lighter receptacles and, thus, seat covers with electrically powered cooling and heating elements cannot be used. Seat covers with electrically powered cooling and heating elements are also not suited for use when sitting outdoors or enjoying recreational activities, for example, when sitting on a lawn chair, beach chair, or other type of seating structure having a seat and backrest, or having no back rest, such as stadium seats and bleachers.

There are also several patents directed toward apparatus which enables cooling or heating to be portably delivered to users without requiring power obtained from a vehicle engine or its air conditioning system, or from batteries. The patents issued to Baldwin, Leudtke, Owens, and Shang, are some examples of these types of seating apparatus.

Baldwin, U.S. Pat. No. 6,007,572, discloses a thermal seat that includes a seat panel and a back panel, both of which include a first rigid support and a second rigid support along the lateral sides of a central cushioned region, and first and second adjustable side straps attaching the seat panel and the back panel to provide a predetermined angle and a sturdy and comfortable sitting arrangement. The central cushioned region of formed by two foam layers and a thermal unit which includes a flexible envelope and a material that can be heated by a microwave oven or cooled in a refrigerator or freezer, is received within the foam layers of the central cushioned region of the seat panel, the back panel, or both.

Owens, U.S. Pat. Nos. 5,545,198; 5,700,284; and 5,357,693 discloses a heating seat cushion and methodology for providing portable, removable heating and/or cooling that is administered locally within a flexible plastic permanently vacuum-sealed envelope. To prevent leakage of heating or cooling material in either liquid or solid form, the envelope includes an absorbent material such as a compressed synthetic sponge. This sealed envelope may be emplaced within an outer envelope having a rubberized coating to render it impervious to water.

Luedtke, U.S. Pat. No. 6,857,954, discloses an apparatus for cooling a seat or chair in the absence of forced air. Comprising a parallel array of thin tubular conduits, it is held in situ by a pair of supports and removes heat from implicated contact surfaces via free convection—upward air flow attributable to a density differential.

Shang, U.S. Pat. No. 6,132,455 discloses a cooling cushion having an encapsulated phase change composition which includes sodium sulfate decahydrate that is activated by the body heat of a seated or reclining person that raises the interface temperature between the person and the cushion surface. The generation of heat by the seated or reclining person raises the interface temperature between the person and the cushion surface to above the melting temperature of the sodium sulfate decahydrate while maintaining for a comfortable cushion/person interface temperature for the seated or reclining person.

There are also several removable seat cooling covers and cushion products for temporarily placement into a child's car seat to cool the seat that are currently being marketed. For example, the "SEAT CHILLER"® manufactured and marketed by Baby Dagny LLC, of Palm Desert, Calif. (www.babydagny.com); the "COLD SEAT"® manufactured and marketed by the Chaden Company LLC, of Phoenix, Ariz. (www.coldseat.com) are elongate flexible one-size-fits-all roll-up ice-pack type cooling devices made of vinyl and flannel having flexible freezable ice packs embedded therein that fit into a child's car seat. The devices are placed in a freezer and then placed on the child's car seat for a short time period, and are removed before buckling the child in. These devices are intended to cool the seat and its buckles and, when removed, the child can comfortably be placed into the car seat. The devices can be used to keep the seat chilled between stops while shopping or anytime the car will be sitting in the hot sun. These manufacturers of these products warn that the child should not be placed on top of the cover or pad.

The "BABYBEECOOL"® car seat cooler pad manufactured and marketed by D D & G Holdings 1, LLC of Phoenix, Ariz. (www.babybeecool.com) is a another removable car seat cooling pad that holds two reusable ice packs and is used to keep and infant car seat, harness, buckles and seat belts cold and the manufacturer warns that the child should never be placed on the pad itself. The pad can be folded into a bag for dual use as a beverage and food cooler. U.S. Pat. No. 7,517,013 also assigned to D D & G Holdings 1, LLC of Phoenix, Ariz. discloses a similar cooling pad that holds two reusable ice packs and is used to cool the surface of an adult sized vehicle seat or seat belt hardware, rather than a person sitting on the pad, and can be folded into a bag for dual use as a beverage and food cooler. After the seat has been cooled, the pad is removed to allow a person to sit in the seat.

SUMMARY OF THE INVENTION

The present invention overcomes the aforementioned problems and is distinguished over the prior art in general, and these patents in particular by a removable seat/backrest cover for covering the seat and/or backrest of a seating structure. The seat/backrest cover has one or two thermally insulated pockets on the front panel that removably receive freezable or microwaveable gel packs for providing cooling or heating comfort to a person occupying the covered portion of the seating structure. The outer side wall of each pocket is formed of a durable flexible water-resistant and mildew-resistant material and, unlike most prior art cooling and heating pads, the inner side wall of each pocket is a thermally insulating panel formed of a generally rectangular flexible sheet of metalized foil film laminated to closed cell polyethylene foam. The metallic foil sheeting is shiny and reflective and faces the interior of the pocket in opposed relation to the outer side wall and the foam faces the inner facing surface of the rear panel of the cover. The foil forms a reflective thermal barrier that radiates hot or cold temperatures toward the outer side wall and the foam facilitates maintaining the hot or cold gel pack contained in the pocket at a constant temperature. The removable seat/backrest cover may be secured on the seating structure by an adjustable strap assembly formed of nylon webbing, and it may be provided with a handle at one or both ends to allow easy carrying. The removable seat/backrest cover is particularly suited for use in vehicles that are typically not equipped with electrical accessory receptacles or cigarette lighter receptacles and outdoor environments where access to an electrical outlet may not be available.

It is therefore an object of the present invention to provide a removable seat/backrest cover having one or two thermally insulated pockets on the front panel that receive freezable or microwaveable gel packs for providing cooling or heating comfort to a person occupying the covered portion of the a seating structure.

It is another object of this invention to provide a removable seat/backrest cover having one or two thermally insulated pockets on the front panel that does not require connection to electrical accessory receptacles, cigarette lighter receptacles, or electrical outlets.

Another object of this invention is to provide a seat/backrest cover having one or two thermally insulated pockets on the front panel for receiving a hot or cold gel pack which have an outer side wall formed of a durable flexible water-resistant and mildew-resistant material and a thermally insulated inner side wall formed of a generally rectangular flexible sheet of metalized foil film laminated to closed cell polyethylene foam wherein the metallic foil sheeting is shiny and reflective and faces the interior of the pocket to form a reflective thermal barrier that radiates hot or cold temperatures toward the outer side wall and the foam facilitates maintaining the hot or cold gel pack contained in the pocket at a constant temperature.

Another object of this invention is to provide a seat/backrest cover having one or two thermally insulated pockets on the front panel which is easily and quickly mounted on and removed from the seat and/or backrest of a seating structure by an adjustable strap assembly.

Another object of this invention is to provide a seat/backrest cover having one or two thermally insulated pockets on the front panel which may have a handle at one or both ends to allow easy carrying.

Another object of this invention is to provide a seat/backrest cover having one or two thermally insulated pockets on the front panel and a cushioned top portion.

A further object of this invention is to provide a seat/backrest cover having one or two thermally insulated pockets on the front panel, which, depending on the material used for the pockets, may form condensation on the exterior of the pockets to provide additional moist cooling benefits to the user.

A still further object of this invention is to provide a removable seat/backrest cover having one or two thermally insulated pockets on the front panel that receive freezable or microwaveable gel packs for providing cooling or heating comfort to a person occupying the covered portion of a seating structure which is simple in construction, inexpensive to manufacture, and rugged and reliable in operation.

Other objects of the invention will become apparent from time to time throughout the specification and claims as hereinafter related.

DESCRIPTION OF THE PREFERRED EMBODIMENTS

Figure 1:
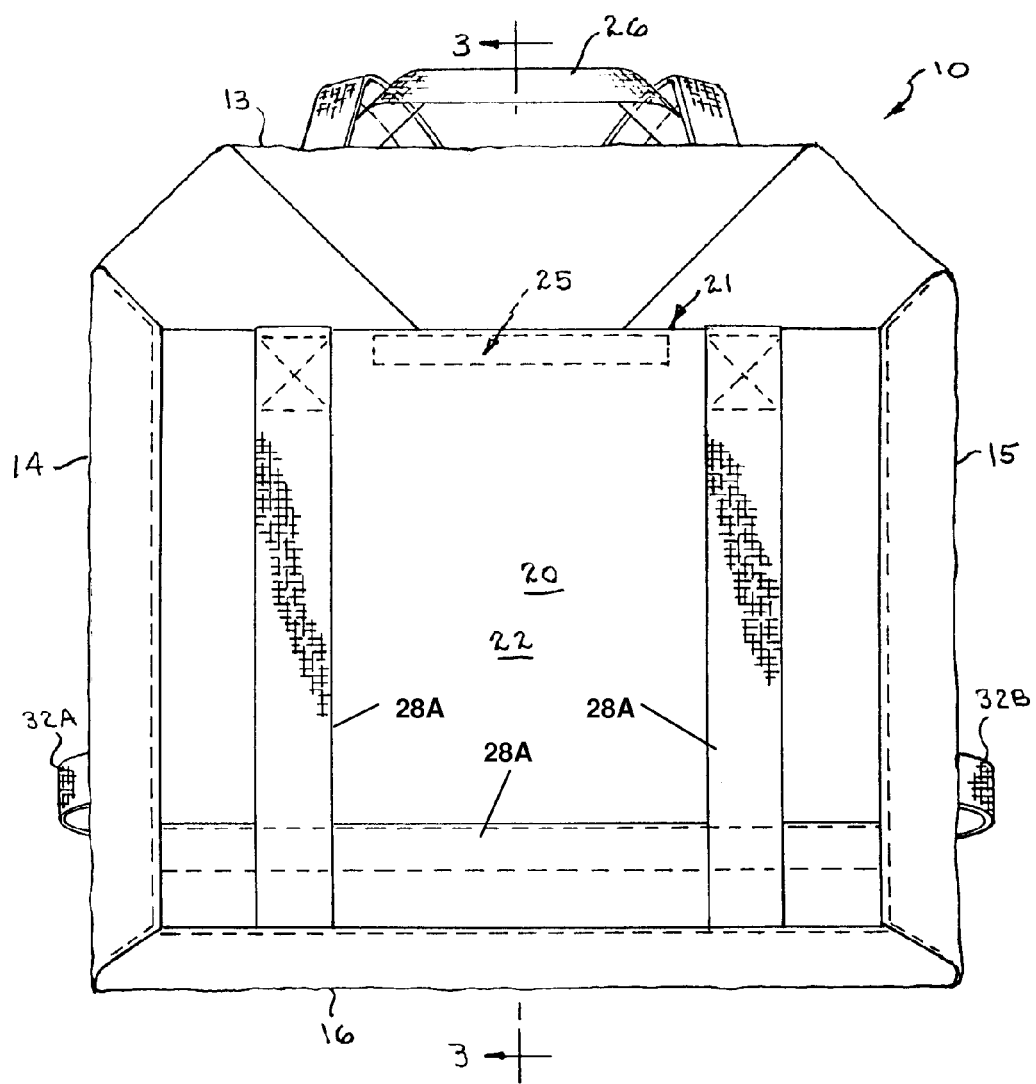
FIG. 1 is front elevation view of the thermal cooling/heating pocketed seat/backrest cover in accordance with a single pocket embodiment of the present invention for use in covering the backrest portion of a seating structure.

The description which follows, and the embodiments described therein, are provided by way of illustration of an example of a particular embodiment, or examples of particular embodiments, of the principles of the present invention. These examples are provided for the purposes of explanation, and not of limitation, of those principles and of the invention. In the description which follows, like parts are marked throughout the specification and the drawings with the same respective reference numerals. The drawings are not necessarily to scale and in some instances proportions may have been exaggerated in order more clearly to depict certain features of the invention. The embodiments depicted in the drawings are examples of the invention particularly suited for use in conjunction with a vehicle seat, however, it should be understood that the present invention may also be used in conjunction with lawn chairs, beach chairs, and other types of seating structures having a backrest, or bench type seating having no back rest, such as stadium seats and bleachers.

Single Pocket Embodiment

Figure 2:
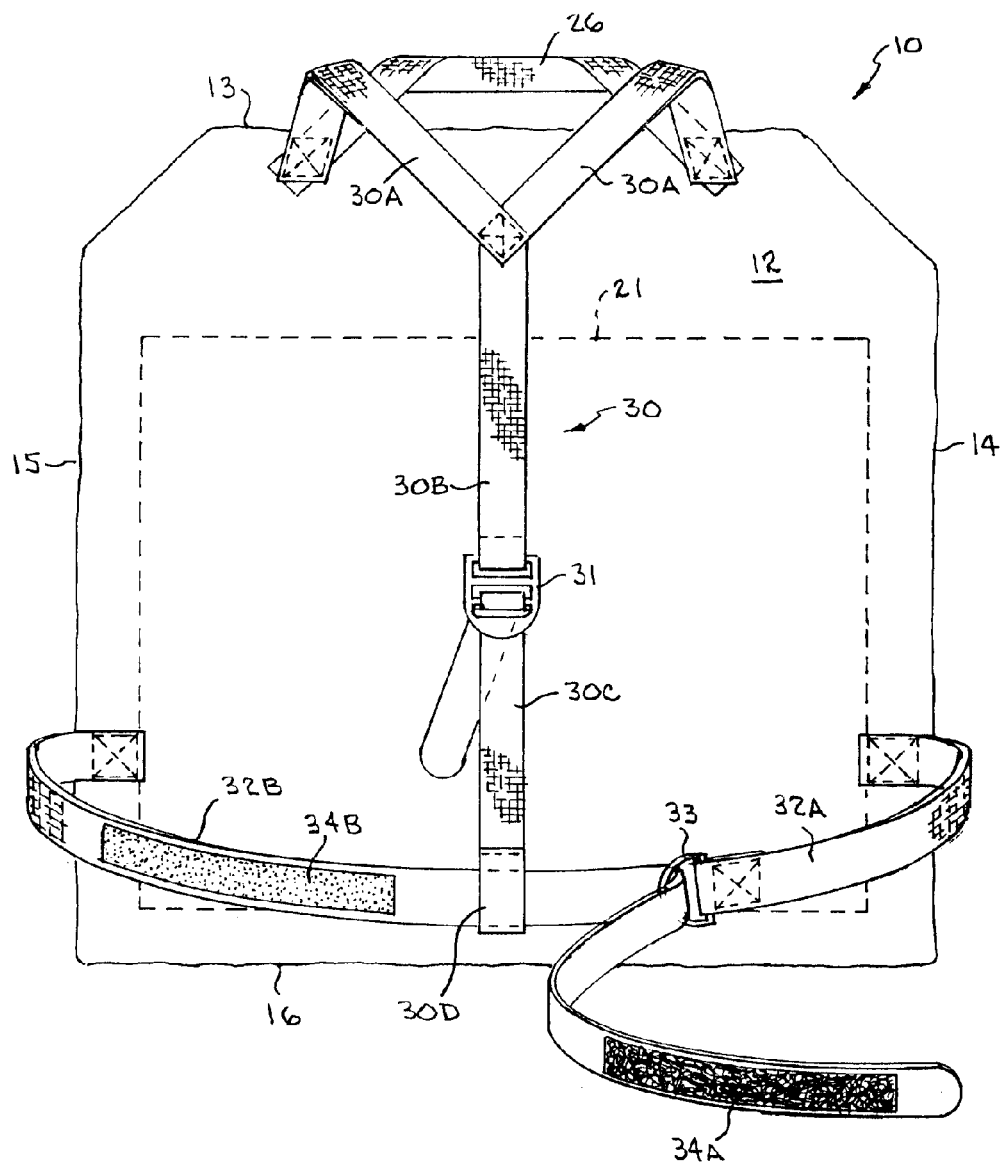
FIG. 2 is rear elevation view of the single pocket embodiment of the thermal cooling/heating pocketed seat/backrest cover of FIG. 1.
Figure 3:
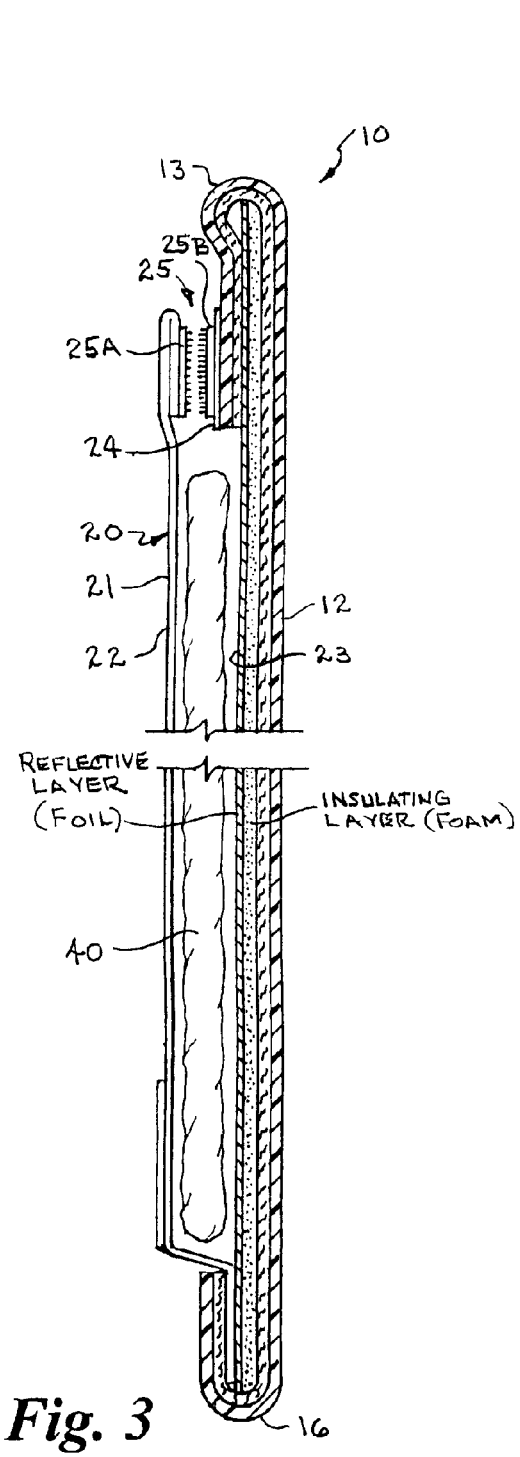
FIG. 3 is a longitudinal cross section of a portion of the seat/backrest cover taken along line 3-3 of FIG. 1, showing the various panels, the proportions of which have been exaggerated in order more clearly to depict the various layers of the panel materials, and the mounting straps and carrying handles are not shown to avoid confusion.

Referring now to the drawings by numerals of reference, there is shown in FIGS. 1-3, a thermal cooling/heating pocketed seat/backrest cover 10 in accordance with a single pocket embodiment of the present invention. The single pocket embodiment of the seat/backrest cover 10 is removably installed on the backrest portion of a seating structure, such a conventional vehicle seat.

The single pocket seat/backrest cover 10 has a rear panel 12 and a front panel 20. The rear panel 12 is formed of a generally rectangular flexible sheet of waterproof artificial leather or other durable flexible water-resistant and mildew-resistant material. In a preferred embodiment, the rear panel 12 is formed of a heavy-duty, durable leatherette or vinyl material that has a felt backing layer on the inward facing side, but not limited thereto.

The top end 13 of the rear panel 12 may be folded inwardly toward the center from two laterally opposed sides to form a generally V-shaped configuration, and then the V-shaped configuration folded over the inward facing surface of the rear panel and secured in the folded configuration by sewing, glue or other conventional fastening means. After the folded top end is secured, the upper end of the rear panel 12 has a relatively wide generally rectangular top end and diagonal corners, closely resembling the end of a conventional folded paper wrap. The folded top end of the rear panel 12 may also be secured when attaching the pocket, as described hereinafter.

The front panel 20 of the cover 10 is a large pocket 21 having an outer side wall 22 and an inner side wall 23. The outer side wall 22 of the pocket 21 is formed of a generally rectangular flexible sheet of water resistant denier oxford nylon or other durable flexible water-resistant and mildew-resistant material. In a preferred embodiment, the outer side wall 22 of the pocket 21 is formed of a 200 or 210 denier polyester oxford nylon material with a waterproof coating such as urethane, for example, but not limited thereto. Another example for a suitable material for use is 70 denier PVC backed nylon taffeta. The top of the outer side wall 22 is folded over and stitched or otherwise secured to form an inner facing hem. The top of the outer side wall 22 is folded over and stitched or otherwise secured to form an inner facing hem. Depending on the material used for fabricating the pocket 21, condensation may form on the exterior of the outer side wall to provide additional moist cooling benefits to the user.

The outer side wall 22 of the pocket 21 may be provided with one or more vertical and/or horizontal strips 28A of water resistant material which may be stitched or otherwise secured to the outer surface of the pocket. The vertical and/or horizontal strips 28A and stitching serve to reinforce the pocket material and aid in maintaining a cold and hot gel pack contained in the pocket (described hereinafter) in a vertical position.

The inner side wall 23 of the pocket 21 is a thermally insulating panel formed of a generally rectangular flexible sheet of metalized foil film laminated to closed cell polyethylene foam. The metallic foil sheeting is shiny and reflective and faces the interior of the pocket 21 in opposed relation to the outer side wall 22 and the foam faces the inner facing surface of the rear panel 12. Such a material is sold under the trademark "THERMA-FLECT"™, by California Innovations Inc., of Ontario, Canada. Such a material is also commercially available from Foam Converting division of Package Depot Inc., of Louisville, Colo. This thermally insulating material may be provided with a thin metalized reflective foil layer laminated to foam of a thickness of from about to 3/32" to 1/8" thick. The foil forms a reflective thermal barrier to radiate hot or cold temperatures toward the outer side wall 22 of the pocket 21 and the foam facilitates maintaining the contents of the pocket (described hereinafter) at a constant temperature.

A strip 24 of the water resistant material used to form the outer side wall 22 of the pocket 21 may be stitched or otherwise secured to the folded over portion of the back wall 12, or to the top of the inner side wall 23 of the pocket 21, in opposed relation to the hem on the outer side wall 23. Alternatively, the top of the inner side wall 23 of the pocket 21 may be folded over and stitched or otherwise secured to form an inner facing hem in opposed relation to the hem on the outer side wall 23. As discussed above, the folded top end 13 of the rear panel 12 may also be secured in the folded position when the strip of water resistant material is stitched or otherwise secured to the top of the inner side wall 23 of the pocket 21 or when the top of the inner side wall is hemmed and stitched.

In the single pocket embodiment of the seat/backrest cover 10, the pocket 21 is secured to the rear panel 12 along three sides by folding the laterally opposed sides 14, 15, and bottom end 16 of the rear panel over the laterally opposed sides and bottom end of the superposed outer side wall 22 and inner side wall 23 of the pocket 21 to form a hem and stitching or otherwise securing them all together along three sides.

The top ends of the outer and inner side walls 22 and 23 of the pocket 21 are provided with releasable fastener means 25. In a preferred embodiment, but not limited thereto, the fastener means 25 comprises a strip 25A of a first element of a hook and loop fastener material such as VELCRO™ which is secured to the inner facing hem of the outer side wall 22 and a strip 25B of the mating element of the fastener material is secured to the opposed inner facing hem or strip of water resistant material of the inner side wall 23 of the pocket. In a preferred embodiment, the strip of the hook element (the fuzzy element) is secured to the inner facing hem of the outer side wall 22 and the mating element of the fastener material is secured to the opposed inner facing hem or strip of water resistant material of the inner side wall 23 of the pocket. It should be understood that other conventional releasable fastener means may be utilized, such as a zipper or mating snap fasteners.

The single pocket seat/backrest cover 10 may also be provided with a loop handle 26 at one or both ends (one end shown) formed of a strip of webbing stitched to the top 13 and/or bottom end 16 of the rear panel 12 for carrying the cover in an unfolded or folded condition.

As best seen in FIG. 2, the rear panel 12 is provided with a strap assembly 30 formed of nylon webbing for removably mounting the cover 10 on the backrest portion of the conventional vehicle seat. The strap assembly 30 has a generally Y-shaped upper portion formed of a pair of webbing straps 30A secured at their top ends to the upper end of the rear panel 12 in laterally spaced relation, such as by stitching and their lower converging ends secured to the upper end of a third vertical webbing strap 30B, such as by stitching. The bottom end of the vertical strap 30B is looped over the slot at one end of a cinch buckle 31 and sewn onto itself. Alternatively, the bottom end of the vertical strap 30B may be provided with longitudinally spaced strips of mating elements of hook and loop fastener material such as VELCRO™ which are secured together after being looped over the slot at the top end of the cinch buckle 31. The top end of a vertical adjustable cinch strap 30C is fed through the slot at the opposed end of the cinch buckle 31 and its opposed end is looped over and sewn to itself to from a loop 30D at its bottom end. Alternatively, the top end of the adjustable cinch strap 30C may be provided with longitudinally spaced strips of mating elements of hook and loop fastener material such as VELCRO™ which are secured together after being looped over the slot at the bottom end of the cinch buckle 31.

The strap assembly 30 has a lower portion formed of a first webbing strap 32A and second webbing cinch strap 32B, respectively, each secured at their outer ends to a respective lateral side 14 and 15 of the rear panel 12 in laterally opposed relation. The free end of the first webbing strap 32A is looped over a D-ring 33 and sewn to itself. The outer facing surface of the second cinch strap 32B is provided with strips 34A, 34B, of mating elements of hook and loop fastener material such as VELCRO™ which are secured in longitudinally spaced relation near the end secured to the rear panel 12 and near its free end. The free end of the second cinch strap 32B is fed through the loop 30D at the bottom end of the vertical adjustable cinch strap 30C and through the D-ring 33 of the first webbing strap 32A, and looped over itself to engage the mating strips 34A, 34B of the hook and loop fastener material.

The single pocket embodiment of the cover 10 is removably installed on the backrest portion of a conventional seating structure, such as a vehicle seat, by placing the straps 30A of the Y-shaped upper portion over the headrest of the seat such that the rear panel 12 of the cover is against the front surface of the backrest portion. The first cinch strap 32A and second cinch strap 32B at the lower end of the cover 10 are placed around the lower end of the backrest portion, and the free end of the second cinch strap 32B is fed through the loop 30D at the bottom end of the vertical adjustable cinch strap 30C and through the D-ring 33 of the first webbing strap 32A, and looped over itself to engage the mating strips 34A, 34B of the hook and loop fastener material such the lower end of the cover 10 is firmly engaged against the front surface of the backrest portion of the seat. The free end of the vertical adjustable cinch strap 30C is pulled through the slot of the cinch buckle 31 such the upper end of the cover 10 is firmly engaged against the front surface of the backrest portion of the vehicle seat.

It should be understood that, alternatively, the rear panel 12 may be provided with an upper and a lower pair of first and second elastic straps, each secured at their outer ends to a respective lateral side 14 and 15 of the rear panel 12 in laterally opposed, vertically spaced relation. The free ends of the first and second elastic straps may be provided with conventional mating buckle elements.

A conventional flexible reusable cold and hot gel pack 40 of the type which may be frozen in the freezer compartment of a home refrigerator or heated in a microwave oven is placed into the large insulated pocket 21 to provide cooling or heating. Such cold and hot gel packs are available from a variety of manufacturers. Another long-lasting reusable gel pack, suitable for use in the present cover is manufactured in Australia by Techni Ice, and distributed by Greer Products, LLC, of Spring, Tex. This is a 4-ply ice pack comprised of two non-woven textile layers and two heavy duty plastic layers containing a one-way microperforation technology bonded to the textile layers, which encapsulate a specially formulated cross-linked polyacrylate polyalcohol co-polymer refrigerant combined with a post treated trade secret formula.

The shiny reflective metallic foil sheeting laminated to closed cell polyethylene foam of the thermally insulating panel forming the inner side wall 23 of the large insulated pocket 21 faces the interior of the pocket in opposed relation to the outer side wall 22 of the large pocket and the foam faces the inner facing surface of the rear panel of the cover. The foil forms a reflective thermal barrier that radiates cold or hot temperatures toward the outer side wall 22 and the foam facilitates maintaining the cold or hot gel pack 40 contained in the pocket at a constant temperature.

Cushioned Top End Portion

Figure 3A:
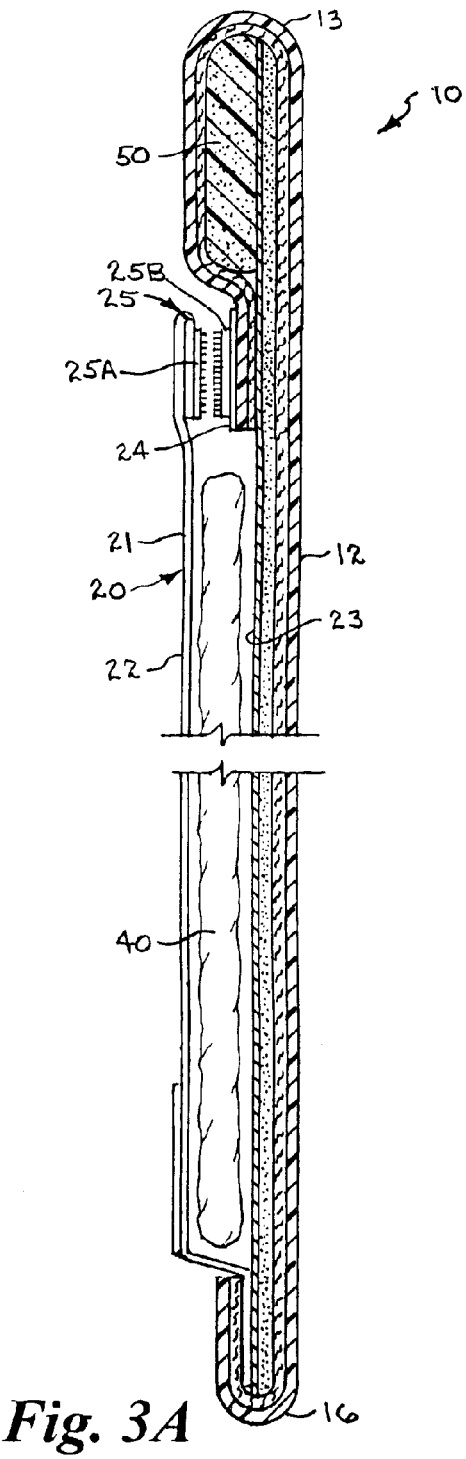
FIG. 3A is a longitudinal cross section of a portion of the seat/backrest cover taken along line 3-3 of FIG. 1, showing a modification the seat/backrest cover having a cushioned top portion, the proportions of the various being exaggerated in order more clearly to depict the various layers of the panel materials, and the mounting straps and carrying handles are not shown to avoid confusion.

FIG. 3A is a longitudinal cross section of a portion of the seat/backrest similar to FIG. 3, showing a modification the seat/backrest cover 10 which has a cushioned top portion. The components which have been previously shown and described are assigned the same numerals of reference, but will not be described again in detail here to avoid repetition. In this modification, prior to folding the top end 13 and sides of the rear panel 12, a soft cushioning material 50 is placed on the inner facing surface of the rear panel and, thereafter, the top end 13 of the rear panel 12 is folded inwardly toward the center from two laterally opposed sides over the cushioning material to form the generally V-shaped configuration, and then the V-shaped configuration folded over the cushioning material on the inward facing surface of the rear panel and secured in the folded configuration by sewing, glue or other conventional fastening means, as described previously. After the folded top end is secured, the upper end of the rear panel 12 has a relatively wide and generally rectangular top end and diagonal corners.

Double Pocket Embodiment

Figure 4:
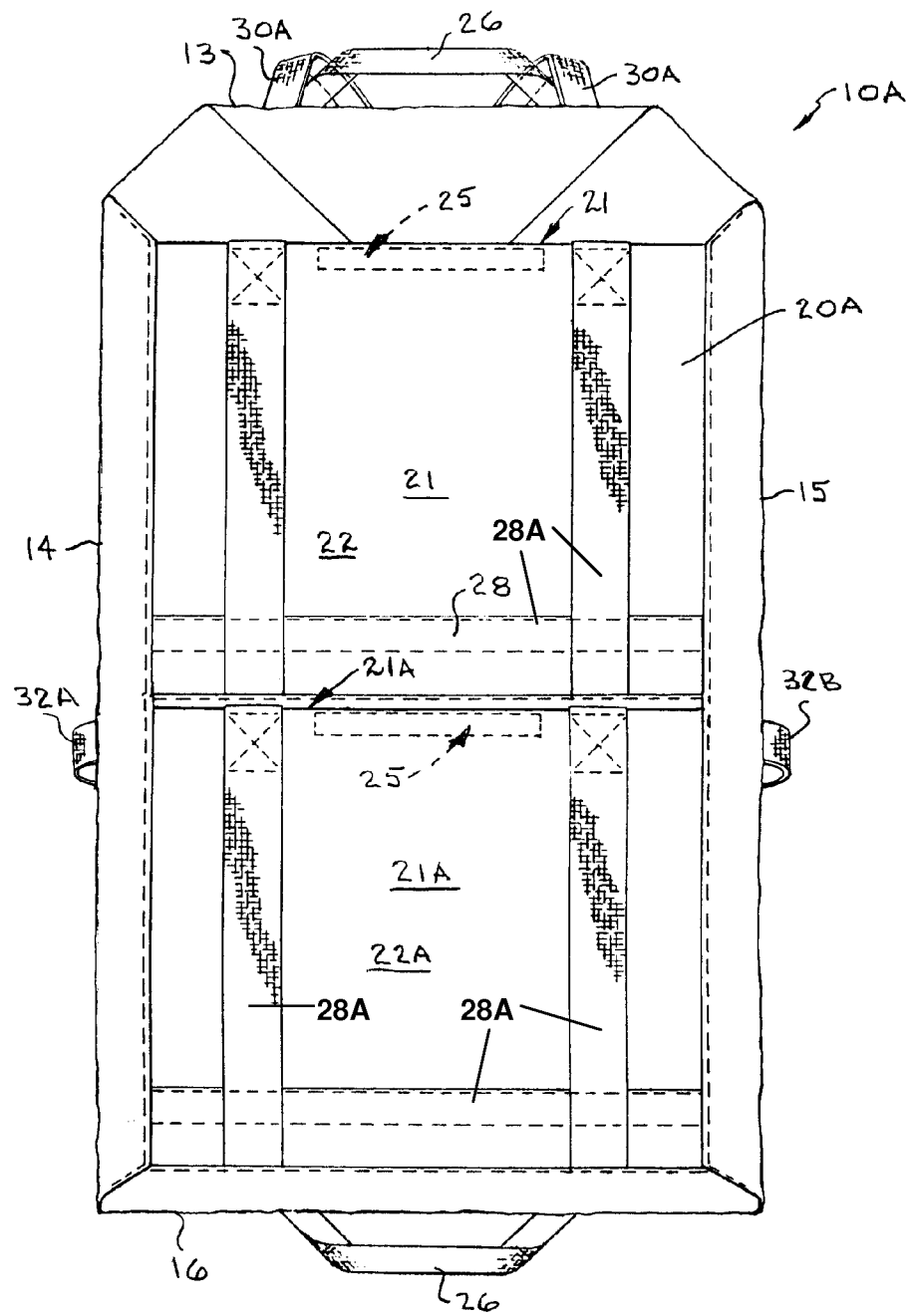
FIG. 4 is a front elevation view of a double pocket embodiment of the thermal cooling/heating pocketed seat/backrest cover, shown in an open condition to more clearly depict the second or lower pocket.
Figure 5:
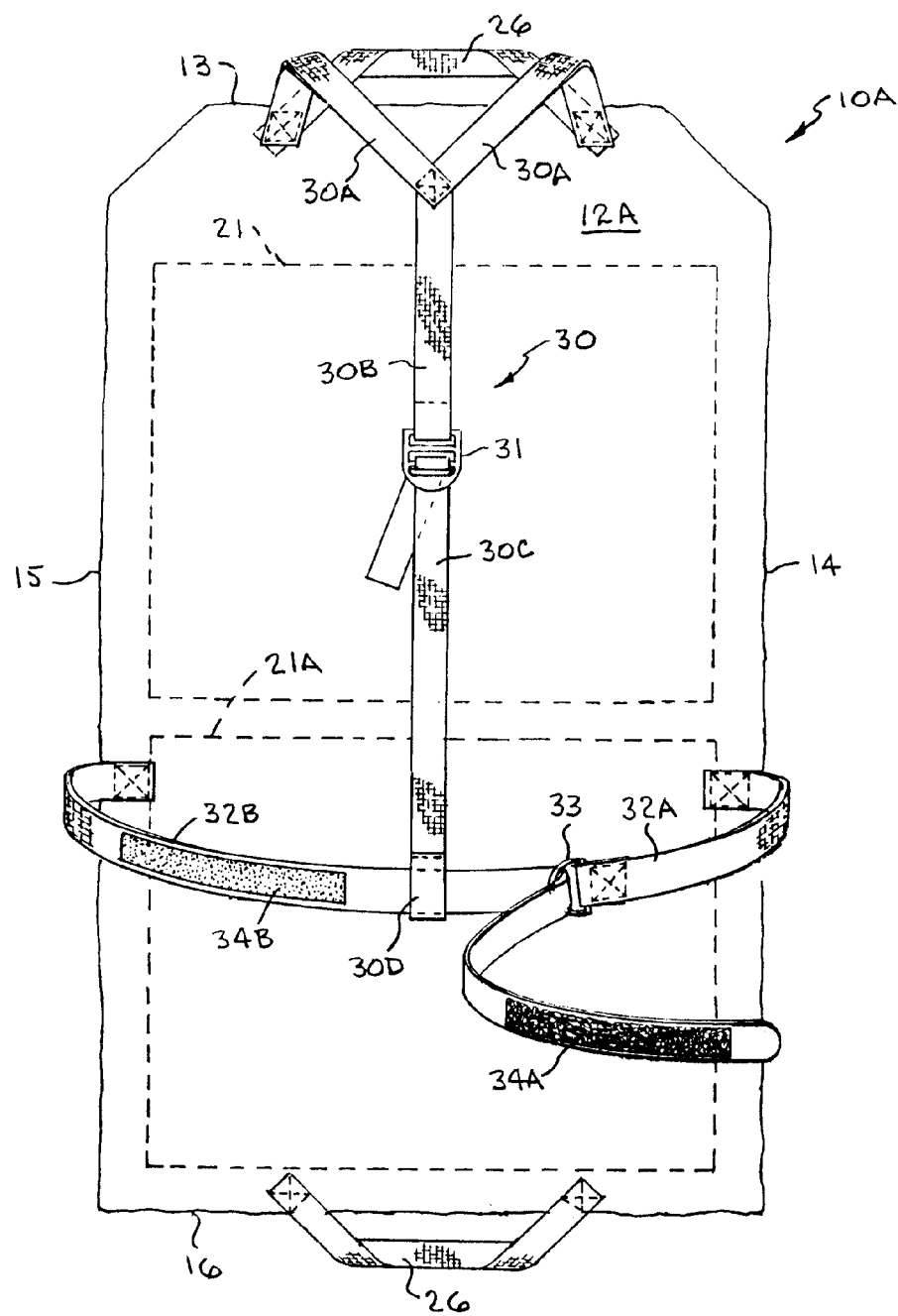
FIG. 5 is rear elevation view of the double pocket embodiment of the thermal cooling/heating pocketed seat/backrest cover of FIG. 4.

Referring now to FIGS. 4A, 4B and 5, there is shown a double pocket embodiment of the thermal cooling/heating pocketed seat/backrest cover 10A. The components which have been previously shown and described are assigned the same numerals of reference, but will not be described again in detail here to avoid repetition.

As with the previous embodiment, the double pocket embodiment 10A has a rear panel 12A formed of a generally rectangular flexible sheet of waterproof artificial leather or other durable flexible water-resistant material, such as a heavy-duty, durable leatherette or vinyl material that has a felt backing layer on the inward facing side, but not limited thereto; and a front panel 20A formed of a generally rectangular flexible sheet of waterproof artificial leather or other durable flexible water-resistant material, such as heavy-duty, durable leatherette or vinyl material that has a felt backing layer on the inward facing side, but not limited thereto. The top end 13 of the rear panel 12A may be folded and secured in the manner of a conventional folded paper wrap, as described in detail previously. The double pocket embodiment 10A may also be provided with a cushioned top portion, as previously shown and described with reference to FIG. 3A, but will not be described again in detail here to avoid repetition.

The double pocket seat/backrest cover 10A differs from the single pocket seat/backrest cover, in that the rear panel 12A and front panel 20A are longer and a second large insulated pocket 21A is provided on the front panel beneath the first or upper pocket 21. The upper portion of the front panel 20A of the cover 10A is a large pocket 21 having an outer side wall 22 and an inner side wall 23. The outer side walls 22 of the pockets 21, 21A are formed of a generally rectangular flexible sheet of water resistant denier oxford nylon or other durable flexible water-resistant and mildew-resistant material, such as 200 or 210 denier polyester oxford nylon material with a waterproof coating such as urethane, or 70 denier PVC backed nylon taffeta, for example, but not limited thereto. The top of the outer side walls 22 of the pockets are folded over and stitched or otherwise secured to form an inner facing hem.

The inner side wall 23 of the pockets 21, 21A is a thermally insulating panel formed of a generally rectangular flexible sheet of metalized foil film laminated to closed cell polyethylene foam, as described previously, and a strip of the water resistant material may be stitched or otherwise secured to the folded over portion of the rear panel 12A or to the top of the inner side wall 23 of the pocket 21A or the top of the inner side wall 23 of the pocket 21 may be folded over and stitched, as previously described.

In this embodiment, a strip 28 of the water resistant material extends horizontally across the lower portion of the outer side wall 22 of the upper pocket 21 and is stitched to the rear panel 12A to form the bottom of the upper pocket 21 and the bottom end of the outer side wall of the upper pocket extends a distance below the horizontal strip. As with the previous embodiment, the outer side wall of the pockets 21 and 21A may be provided with one or more vertical and/or horizontal strips 28A of water resistant material stitched or otherwise secured to the outer surface of the pocket which serve to reinforce the pocket material and aid in maintaining a cold and hot gel pack contained in the pockets in a vertical position.

The lateral sides of the outer side wall 22 and inner side wall 23 of the first or upper pocket 21 and the second or lower pocket 21A are secured to the rear panel 12A by folding the laterally opposed sides 14, 15 of the rear panel over the laterally opposed sides to form a hem and stitching or otherwise securing them together, and the bottom end 16 of the rear panel is folded over the bottom ends of the second or lower superposed outer side wall 22A and inner side wall 23A of the second or lower pocket 21A to form a hem and stitching or otherwise securing them together.

The top end of the outer side wall 22A of the upper and lower pockets 21, 21A are folded over to form an inner facing hem. A strip of a first element of a hook and loop fastener material such as VELCRO™ is secured to the inner facing hem of the outer side wall 22A and a strip of the mating element of the fastener material is secured to the opposed horizontal strip 24 of water resistant material at the bottom of the of first or upper pocket 21A. It should be understood that other conventional releasable fastener means may be utilized, such as a zipper or mating snap fasteners.

As best seen in FIG. 5, the double pocket seat/backrest cover 10A is also provided with the same nylon webbing mounting strap assembly 30 as shown and described previously, which will not described in detail again to avoid repetition. The double pocket embodiment of the cover 10A is removably installed on the vehicle seat by placing the straps 30A of the Y-shaped upper portion of the strap assembly 30 over the headrest of the backrest portion of the seat and such that the lower portion of the rear panel 12A of the cover 10A is disposed on the top surface of the vehicle seat with the lower pocket 21A facing upward, and the upper portion of the rear panel of the cover is against the front surface of the backrest portion with the upper pocket 21A facing outward. The mounting straps are then connected and cinched, as described previously, such that the cover is firmly engaged against the front surface of the backrest portion of the vehicle seat.

In this embodiment a flexible reusable hot and cold gel ice pack 40 of the type which may be frozen in the freezer compartment of a home refrigerator or heated in a microwave oven is placed into either one or both of the large insulated pockets 21 and/or 21A to provide cooling or heating. The shiny reflective metallic foil sheeting laminated to closed cell polyethylene foam of the thermally insulating panel forming the inner side wall 23, of the large insulated pockets 21, 21A, face the interior of the pockets in opposed relation to the outer side wall 22 of the large pockets and the foam faces the inner facing surface of the rear panel of the cover. The foil forms a reflective thermal barrier that radiates cold or hot temperatures toward the outer side walls of the pockets and the foam facilitates maintaining the hot or cold gel pack contained in the pocket at a constant temperature.

The double pocket seat/backrest cover 10A may also be provided with loop handles 26 at each end formed of strips of webbing stitched to top and bottom ends of the rear panel 12A for carrying and transporting the cover in a folded condition. The double pocket seat/backrest cover 10A may also with a cushioned top portion, as shown and described previously with reference to FIG. 3A.

Although the present thermal cooling/heating seat/backrest cover has been described for purposes of example, as being utilized on conjunction with a vehicle seat, it should be understood that it may also be removably installed on lawn chairs and beach chairs, and other types of seating structures having a backrest, or may be placed on a bench type seat having no back rest, such as stadium seats and bleachers.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. A removable thermal cooling/heating seat/backrest vehicle seat cover for providing cooling and heating comfort to a user seated thereon, comprising:
   a seat/backrest vehicle seat cover having top and bottom ends and laterally opposed sides;
   a generally rectangular rear panel formed of a durable flexible water-resistant material;
   a front panel including at least one large thermally insulated pocket having an outer side wall formed of a generally rectangular flexible sheet of water-resistant material, and an inner side wall formed of a generally rectangular flexible sheet of shiny reflective metalized foil laminated to closed cell polyethylene foam, the foil facing the interior of the pocket in opposed relation to said outer side wall, and the foam facing an inner facing surface of said rear panel;
   an adjustable upper mounting strap assembly and an adjustable lower mounting strap assembly for releasably mounting said seat cover on a backrest portion of a vehicle seat, each being adjustable to firmly engage an upper end and a lower end of said seat cover against a front surface of the backrest portion of the vehicle seat;
   said thermally insulated pocket adapted to receive a freezable or microwaveable gel pack; and
   releasable fastener means at an upper end of said pocket for enclosing the gel pack therein;
   said shiny reflective metalized foil laminated to closed cell polyethylene foam forming a reflective thermal barrier that radiates cold or hot temperatures emanating from the gel pak toward the said pocket outer side wall to provide cooling or heating comfort to a person occupying the covered portion of the vehicle seat, and said foam facilitating maintaining the gel pack contained in said pocket at a constant temperature.

2. The removable thermal cooling/heating seat/backrest vehicle seat cover according to claim 1, wherein
   said front panel includes an upper and a lower large thermally insulated pocket, each adapted to receive a freezable or microwaveable gel pack, and each having an outer side wall formed of a generally rectangular flexible sheet of water-resistant material, and an inner side wall formed of a generally rectangular flexible sheet of shiny reflective metalized foil laminated to closed cell polyethylene foam, said foil facing the interior of the respective said pocket in opposed relation to said outer side wall forming a reflective thermal barrier that radiates cold or hot temperatures toward the outer side wall, and said foam facing an inner facing surface of said rear panel facilitating maintaining the gel pack contained in said pocket at a constant temperature.

3. The removable thermal cooling/heating seat/backrest vehicle seat cover according to claim 1, further comprising:
   a carrying handle on at least one of said top or bottom ends for carrying and transporting said cover in an unfolded or folded condition.

4. The removable thermal cooling/heating seat/backrest vehicle seat cover according to claim 1, further comprising:
   a cushioned top portion containing a cushioning material disposed between said top end of said seat/backrest seat cover and said top end of said large thermally insulated pocket.

5. The removable thermal cooling/heating seat/backrest vehicle seat cover according to claim 1, wherein
   said upper mounting strap assembly comprises a generally Y-shaped upper portion formed of a pair of straps secured at respective upper ends to said top end of seat cover in laterally spaced relation and having lower converging ends disposed adjacent to said rear panel, a vertical strap secured at a top end to said converging ends having a cinch buckle secured at a bottom end thereof, and an adjustable length vertical cinch strap having an upper end received through said cinch buckle and a loop formed in a bottom end; and
   said lower adjustable mounting strap assembly comprises a first horizontal strap and a second adjustable length horizontal cinch strap, each having an outer end secured to a respective lateral side of said rear panel in laterally opposed relation, a D-ring secured to a free end of said first horizontal strap, and first and second mating hook and loop fastener strips on an outer facing surface of said horizontal cinch strap in longitudinally spaced relation; wherein
   said Y-shaped upper portion of said upper strap is received over a headrest of the vehicle seat such that said rear panel of said seat cover is disposed against the front surface of the backrest portion of the vehicle seat, and the free end of said horizontal cinch strap of said lower adjustable mounting strap assembly is passed through said loop at the bottom end of said vertical cinch strap of said upper adjustable mounting strap assembly and through said D-ring of said first horizontal webbing strap and looped over itself to engage said mating hook and loop fastener strips to firmly engage the upper end and a lower end of said seat cover against the front surface of the backrest portion of the vehicle seat.

* * * * *